United States Patent [19]

Kipman et al.

[11] Patent Number: 5,532,815
[45] Date of Patent: Jul. 2, 1996

[54] SYSTEM AND METHOD FOR ALIGNING A FIRST SURFACE WITH RESPECT TO A SECOND SURFACE

[75] Inventors: Yair Y. Kipman, West Newton; Paul A. McDonald, North Billerica; Robert D. Schuchatowitz, Brighton, all of Mass.

[73] Assignee: KDY Associates, Inc., Nashua, N.H.

[21] Appl. No.: 262,551

[22] Filed: Jun. 17, 1994

[51] Int. Cl.$^6$ .................................................. G01B 11/26
[52] U.S. Cl. ................................. 356/139.03; 356/139.1; 356/152.1; 356/375; 356/400
[58] Field of Search ............................ 356/139.03, 199.1, 356/152.1, 375, 400

[56] References Cited

U.S. PATENT DOCUMENTS

| | | | |
|---|---|---|---|
| 4,807,202 | 2/1989 | Cherri et al. | 367/129 |
| 4,964,722 | 10/1990 | Schumacher | 356/152 |
| 5,059,789 | 10/1991 | Salcudean | 250/206.1 |

*Primary Examiner*—Mark Hellner
*Attorney, Agent, or Firm*—Iandiorio & Teska

[57] ABSTRACT

A system for aligning a first surface with respect to a second surface includes means for determining the distances between the first and second surfaces at at least three locations on the surfaces; means, response to the means for determining, for detecting differences in the distances between the first and second surfaces at the at least three locations; and alignment means, responsive to the detecting means for moving at least one of the surfaces until there is no nominal difference in the distances between the first and second surfaces at said at least three locations.

46 Claims, 6 Drawing Sheets

SYSTEM AND METHOD FOR ALIGNING A FIRST SURFACE WITH RESPECT TO A SECOND SURFACE

FIELD OF INVENTION

This invention relates to a system and method for aligning two surfaces with respect to each other. More specifically, this invention relates to a system and method for aligning two surfaces laterally in the X and Y axes and angularly about the X, Y and Z axes so that the surfaces are parallel and so that complementary features located on the two surfaces are coincident.

BACKGROUND OF INVENTION

Spatially aligning two nominally flat surfaces so that they are parallel to one another and so that complementary features appearing on each of the surfaces are coincident is important in various applications such as surface mount technology, hybrid flip chip assembly, and solder reflow attachments with large numbers of interconnects. In order for the features on the two surfaces, such as solder, gold, indium and thick film bumps which are typically bonded thermally, ultrasonically, electrostatically, with epoxy or by RF techniques, to be properly mated when the surfaces are brought together, the surface features must be accurately aligned. Misalignment results in bad connections which cause failures and inoperability.

In order for the surfaces and the features on the surfaces to be properly aligned they must be aligned in five degrees of freedom. That is, they must be aligned laterally in the X and Y axes and angularly about the X, Y and Z axes. Then, the surfaces can be translated along the Z axis so that the surfaces and the features thereon can be mated properly.

Prior art alignment technology employs an imaging system for superimposing the images of two surfaces to be aligned. The superimposed images are then laterally aligned in the X and Y axes, as well as angularly about the Z axis. The remaining two degrees of freedom, i.e. rotation about the X and Y axes, are adjusted based on autocollimation signals returned from the two surfaces being aligned.

Autocollimation techniques use a specular return image signal from the surface and collimation is achieved when the returned image signal overlaps a target image. When aligning two surfaces, there are two returned images, one from each surface, that are caused to overlap by angular rotation of one surface about the system's X and Y axes. In order for autocollimation to work properly, the two surfaces that are being aligned must be smooth and flat, like a plain parallel mirror. Textured and non-planar surfaces often fail to achieve a suitable return signal. The types of surfaces which require alignment, such as the applications discussed above, now contain more surface features and are more textured and thus are less reflective. Therefore, autocollimation is a poor choice for aligning these types of surfaces.

In addition, autocollimation techniques have a fixed accuracy which is in large part determined by the calibration of the particular alignment device. Alignment devices using autocollimation techniques include numerous adjustable optical elements that result in a complex and relatively unstable optical arrangement. Thus, autocollimation devices require, at a minimum, daily calibration. Moreover, as the size of the surfaces to be aligned increases, the accuracy of the autocollimation process decreases. Also, current alignment devices which incorporate autocollimation are not readily automated.

As the surface alignment technology is driven to smaller feature or bump sizes in larger array dimensions, the limitations of autocollimation has resulted in significant manufacturing yield reductions. Thus, a more versatile and effective alignment technique is needed.

SUMMARY OF INVENTION

Is therefore an object of this invention to provide a system and method for very accurately aligning a first surface with respect to a second surface easily and accurately laterally in the X and Y axes and angularly about the X, Y and Z axes so that the surfaces can be brought into parallel alignment and the features on the surfaces can be made coincident except for their separation in the direction of the Z axis.

It is a further object of this invention to provide such a system and method for aligning a first surface with respect to a second surface which is capable of aligning a wide variety of surfaces including textured surfaces and surfaces which are not reflective enough for autocollimation.

It is a further object of this invention to provide such a system and method for aligning a first surface with respect to a second surface in which the system can be easily automated.

It is a further object of this invention to provide such a system and method for aligning a first surface with respect to a second surface in which the accuracy of the alignment increases as the size of the surfaces to be aligned increases.

It is a further object of this invention to provide such a system and method for aligning a first surface with respect to a second surface which accomplishes alignment with no adjustable optical elements in order to provide a less complex and more stable optical arrangement.

It is a further object of this invention to provide such a system and method for aligning a first surface with respect to a second surface which maintains calibration for long periods of time.

It is a further object of this invention to provide such a system and method for aligning a first surface with respect to a second surface which provides a direct measurement of the spatial distance between the surfaces to be aligned.

It is a further object of this invention to provide such a system and method for aligning a first surface with respect to a second surface in which the data regarding the spatial orientation of the surfaces is provided and is quantifiable and recordable to allow for accurate traceability.

It is a further object of this invention to provide such a system and method for aligning a first surface with respect to a second surface in which the locations on the surfaces where the distance between the surfaces are to be measured can be easily chosen.

It is a further object of this invention to provide such a system and method for aligning a first surface with respect to a second surface in which the accuracy of the system is increased by measuring the distance between additional locations on the surfaces.

It is a further object of this invention to provide such a system and method for aligning a first surface with respect to a second surface wherein the surfaces to be aligned may be non-planar, conformal surfaces.

The invention results from the realization that a truly effective system for aligning two surfaces can be achieved by determining the distances between the two surfaces at at least three locations on the surfaces, detecting the differences in the distances between the surfaces at the three locations and aligning the two surfaces by moving at least one of the surfaces until there is no nominal difference in the distances between the first and second surfaces at at least three locations.

This invention features a system for aligning a first surface with respect to a second surface. The system includes means for determining the distances between the first and second surfaces at at least three locations on the surfaces. There are means, responsive to the means for determining, for detecting differences in the distances between the first and second surfaces at the at least three locations. There are also alignment means, responsive to the detecting means, for moving at least one of the surfaces until there is no nominal difference in the distances between the first and second surfaces at the at least three locations.

In a preferred embodiment the means for determining may include optical means and the optical means may include first and second coherent light sources. The first and second coherent light sources may be low power semiconductor lasers. The system may further include means for directing the first light source to one of the first and second surfaces and the second light source to the other of the first and second surfaces. There may further be included means for ascertaining when the first and second light sources are focused on the first and second surfaces at the at least three locations. There may still further be included means for calculating the distances between the surfaces at the at least three locations when the light sources are focused on the surfaces. The alignment means may align the surfaces angularly about the X and Y axes. The alignment means may include means for aligning the two surfaces laterally in the X and Y axes and angularly about the Z axis. The means for aligning the two surfaces laterally and the X and Y axes and angularly about the Z axis may include means for imaging the first and second surfaces. The means for imaging may include means for superimposing first and second images and means for orienting the surfaces with respect to each other to achieve coincidence of complementary features on the surfaces. The means for imaging may include a CCD camera. The means for aligning the two surfaces laterally in the X and Y axes and angularly about the Z axis may include means for identifying and storing position information of the at least three locations on the surfaces before the distances between the surfaces at the locations are determined. The means for aligning may include means for calculating a position adjustment for at least one of the surfaces to effect alignment of the surfaces. There may further be included means for mating the first and second surfaces after alignment has been achieved. The means for mating may include means for applying a pre-determined mating force for a pre-determined period of time to the surfaces to be mated.

The invention also features a system for aligning a first surface with respect to a second surface angularly about the X and Y axes. The system includes a first coherent light source directed at the first surface and a second coherent light source directed at the second surface. There are means for directing the first and second coherent light sources at at least three locations on the first and second surfaces. There are also means, responsive to the means for directing, for detecting any differences between the distances between the first and second surfaces at the at least three locations. In a preferred embodiment there may be further included means for moving at least one of the surfaces until there is no nominal difference between the distances between the first and second surfaces at the at least three locations for aligning the surfaces.

The invention also features a system for aligning a first surface with respect to a second surface laterally in the X and Y axes and angularly about the X, Y and Z axes. There are means for imaging the first and second surfaces and means for superimposing the images of the first and second surfaces. There are also means for detecting any differences in the distances between the first and second surfaces at at least three locations. Finally, there are alignment means, responsive to the means for superimposing and the means for detecting, for aligning the first and second surfaces laterally in the X and Y axes and angularly about the X, Y and Z axes.

The invention further features a system for aligning a first surface with respect to a second surface laterally in the X and Y axes and angularly about the X, Y and Z axes. There are means for imaging the first and second surfaces and means for superimposing the first and second surface images. There are means for identifying and storing at least three positions on the first and second surfaces and means, responsive to the means for identifying and storing, for determining the distances between the first and second surfaces at the at least three locations on the surfaces. There are also means, responsive to the means for determining, for detecting differences in the distances between the first and second surfaces at the at least three locations. Further, there are alignment means, responsive to the means for determining and the means for detecting, for aligning the surfaces laterally in the X and Y axes, angularly about the Z axis, and angularly about the X and Y axes if one of the measured distances between the surfaces differs from any of the other distances at the at least three locations.

The invention features a method for aligning a first surface with respect to a second surface. The method includes determining the distances between the first and second surfaces at at least three locations on the surfaces. The method also includes detecting differences in the distances between the first and second surfaces at the at least three locations and aligning at least one of the surfaces until there is no nominal difference in the distances between the first and second surfaces at the at least three locations.

In a preferred embodiment the method may further include directing a first light source to one of the first and second surfaces and a second light source to the other of the first and second surfaces. The method may also include ascertaining when the first and second light sources are focused on the first and second surfaces at the at least three locations and calculating the distances between the surfaces at the at least three locations when the light sources are focused on the surfaces. The step of aligning may align the surfaces angularly about the X and Y axes and the step of aligning may include aligning the two surfaces laterally in the X and Y axes and angularly about the Z axis. The step of aligning the surfaces laterally in the X and Y axes and angularly about the Z axis may include imaging the first and second surfaces. The step of imaging may include superimposing the first and second images and orienting the surfaces with respect to each other to achieve coincidence of complementary features on the surfaces. The step of imaging may also include imaging the surfaces with a CCD camera. The step of aligning the two surfaces laterally in the X and Y axes and angularly about the Z axis may include identifying and storing position information of the at least three locations on the surfaces before determining the distances between the surfaces. The step of aligning may include calculating a position adjustment for at least one of the surfaces to effect alignment of the surfaces. The method may further include mating the first and second surfaces after alignment has been achieved. The step of mating may include applying a pre-determined mating force for a pre-determined period of time to the surfaces to be mated.

The invention also features a method for aligning a first surface with respect to a second surface angularly about the X and Y axes. The method includes directing a first and a second coherent light source at at least three locations on the first and second surfaces and detecting any differences between the distances between the first and second surfaces at the at least three locations.

In a preferred embodiment, the method may further include moving at least one of the surfaces until there is no nominal difference between the distances between the first and second surfaces at the at least three locations for aligning the surfaces.

The invention also features a method for aligning a first surface with respect to a second surface laterally in the X and Y axes and angularly about the X, Y and Z axes. The method includes imaging the first and second surfaces and superimposing the images of the first and second surfaces. The method also includes aligning the first and second surfaces laterally in the X and Y axes and angularly about the Z axis. The method further includes detecting any differences in the distances between the first and second surfaces at at least three locations and aligning the surfaces angularly about the X and Y axes.

The invention further features a method for aligning a first surface with respect to a second surface laterally in the X and Y axes and angularly about the X, Y and Z axes. The method includes imaging the first and second surfaces and superimposing the first and second surface images. The method also includes identifying and storing at least three locations on the first and second surfaces and aligning the first and second surfaces laterally in the X and Y axes and angularly about the Z axis. The method also includes determining the distances between the first and second surfaces at the at least three identified and stored locations on the surfaces and detecting differences in the distances between the first and second surfaces at the at least three locations. The method further includes aligning the surfaces angularly about the X and Y axes if one the distances between the surfaces differs from any of the other distances at the at least three locations.

DISCLOSURE OF PREFERRED EMBODIMENT.

Other objects, features and advantages will occur to those skilled in the art from the following description of a preferred embodiment and the accompanying drawings, in which.

Figure 1A:
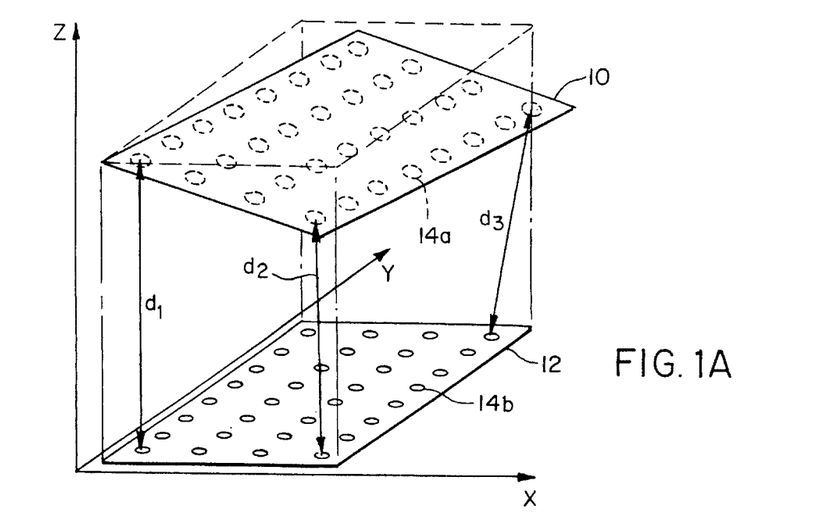
FIG. 1A is a three dimensional view of two surfaces misaligned laterally in the X and Y axes and angularly about the X, Y and Z axes.

Surfaces 10 and 12, FIG. 1, which include a plurality of complementary features or bumps such as feature 14a on surface 10 and feature 14b on surface 12, are shown to be out of alignment. That is, the surfaces 10 and 12, and their complementary features 14a and b, are not precisely in alignment laterally in the X and Y axes or angularly about the Z axes. Moreover, the surfaces are not aligned angularly about the X and Y axes. In many applications, as discussed above, it is desirable to align two surfaces, such as surfaces 10 and 12 laterally in the X and Y axes and angularly about the X, Y and Z axes so that the two surfaces are parallel and the complementary features or bumps on both surfaces are coincident. For example, the features 14a and 14b may be indium bumps, thick film bumps, solder bumps or gold bumps that must be aligned before the surfaces are mated.

Once alignment is achieved, the two surfaces 10 and 12 may be translated towards each other in the Z direction so that the surfaces may be mated resulting in proper mating of the complementary features or bumps on both surfaces. If the surfaces cannot be accurately aligned, as discussed above, the complementary features or bumps on their surfaces will not be coincident and when the surfaces are mated the features on the surfaces will not be properly mated.

Figure 1B:
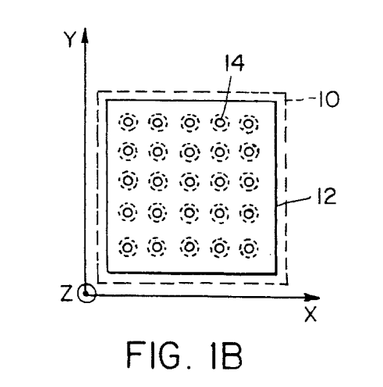
FIG. 1B is a view of the superimposed images of the two surfaces of FIG. 1A wherein the surfaces are aligned laterally in the X and Y axes and angularly about the Z axis.
Figure 1C:
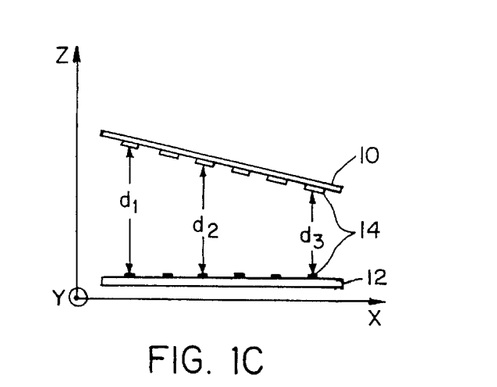
FIG. 1C is a side elevational view of the two surfaces of FIG. 1A wherein the surfaces are misaligned angularly about the Y axis.

If the surfaces 10 and 12 are imaged and superimposed, the surfaces and features may be aligned laterally in the X and Y axes and also angularly about the Z axis, as shown in FIG. 1B. However, there may still be misalignment angularly about the X and/or Y axes which would cause the surfaces not to be oriented parallel to one another. This non-parallel alignment is shown in FIG. 1C, wherein the surfaces are out of parallel alignment about the Y axis. Even though the images of surfaces 10 and 12 when superimposed may be aligned laterally in the X and Y axes and angularly about the Z axis, there still may be misalignment angularly about the X and/or Y axes. When there is misalignment angularly about the X and/or Y axes, the distances (i.e., $d_1$, $d_2$ and $d_3$) between complementary points on the two surfaces will differ.

It is apparent that if the surfaces are not laterally aligned in the X and Y axes and angularly about the Z axis then there will be misalignment of the complementary features on the surfaces and therefore proper mating will not occur. Moreover, assuming that the surfaces are aligned laterally in the X and Y axes and angularly about the Z axis, the complementary bumps on the surfaces may still be misaligned if the two surfaces are not properly oriented in a parallel relationship with respect to each other angularly about the X and Y axes. Parallel alignment can be accomplished by causing the distances $d_1$, $d_2$ and $d_3$, FIG. 1A, between various complementary points on both the surfaces to be equal.

Figure 2:
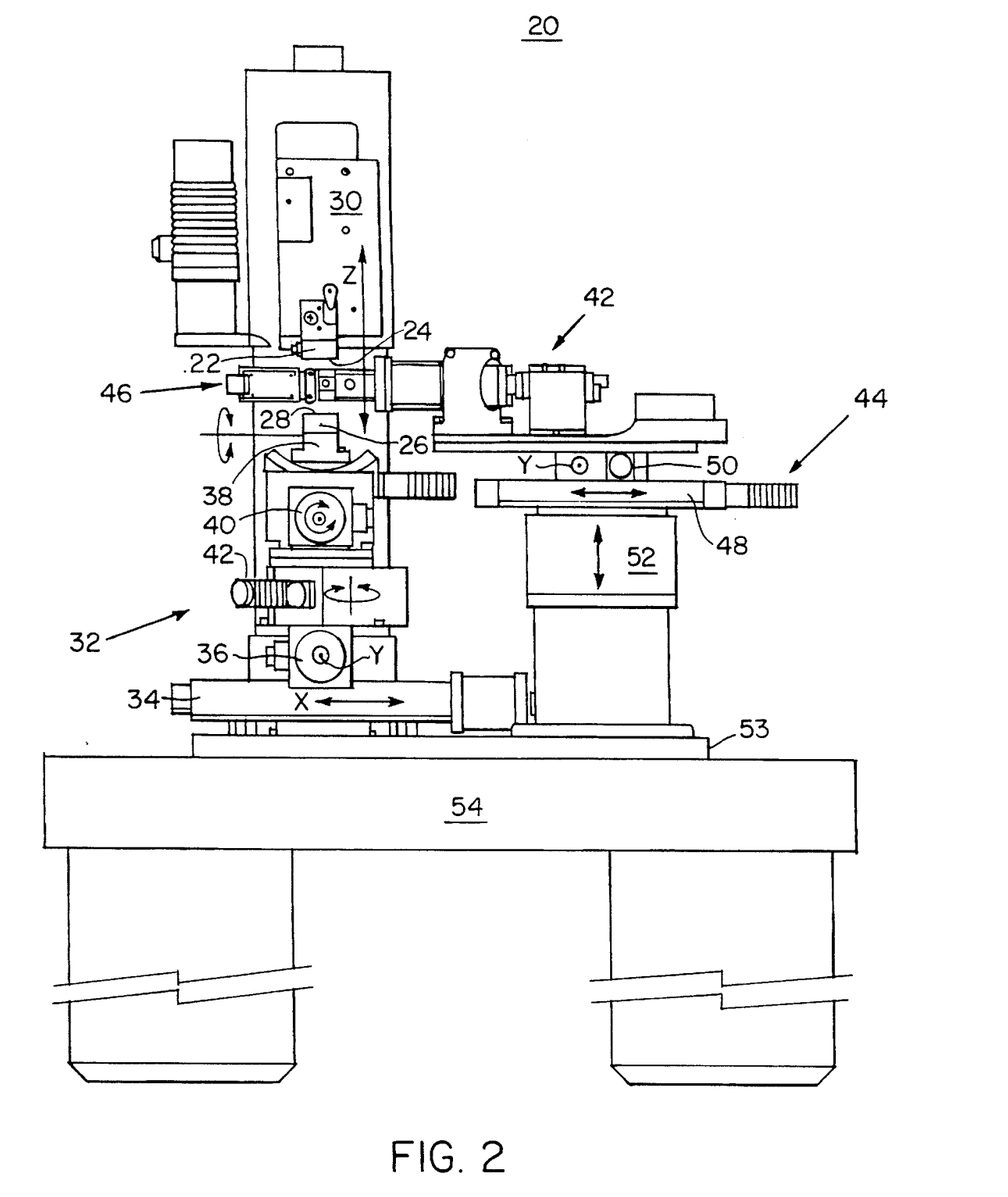
FIG. 2 is a diagrammatic view of the system for aligning a first surface with respect to a second surface according to this invention.

Alignment system 20 according to this invention for aligning a first surface with respect to a second surface is shown in FIG. 2. System 20 includes an upper holding fixture 22 for removeably mounting a first, upper surface to be aligned 24 by means of vacuum pressure. Lower holding fixture 26, opposite holding fixture 22 and in spaced relationship therefrom along the Z direction axis, removeably mounts a second, lower surface to be aligned 28.

Upper holding fixture 22 is mounted on vertical motion stage 30 which allows it to be translated vertically along the Z direction axis so that it may be brought closer to or further away from lower holding fixture 26. Lower holding fixture 26 is positioned on lower motion stage 32 which includes lateral motion drives 34 and 36 for translating the lower holding fixture 26 laterally in the X and Y axes, respectively. Lower motion stage 32 also includes angular motion drives 38, 40 and 42 for rotating the lower holding fixture 26 angularly about the X, Y and Z axes, respectively.

Alignment head 42 is mounted on alignment head motion stage 44. Alignment head 42 includes an optical head 46 and alignment head motion stage 44 includes translation tables 48, 50 and 52 which translate the alignment head 42 and optical head 46 in the X, Y and Z axes, respectively. The optical head 46 enables the imaging of upper and lower surfaces 24 and 28 and enables the surfaces to be superimposed and viewed on a monitor (not shown) so that the upper and lower surfaces may be positioned such that complementary bumps on the two surfaces are superimposed by providing lateral X and Y positioning and rotational positioning about the Z axis. This alignment may be accomplished by joystick control or some other suitable means. The alignment may be accomplished automatically, under computer control, by pattern recognition like the pattern recognition used in photolithography equipment. The optical head 46 is also engaged to measure the separation of the two surfaces 24 and 28 at various points on the two surfaces. This separation information is then used to calculate the direction and amount of rotational positioning of the lower surface 28 angularly about the X and Y axes necessary to align the surfaces. The system accomplishes this alignment under computer control. Alignment of the surfaces, both laterally and angularly, will be discussed in more detail below.

Lower motion stage 32 and alignment head motion stages 44 are mounted on base 53 which is seated upon table 54.

Figure 3:
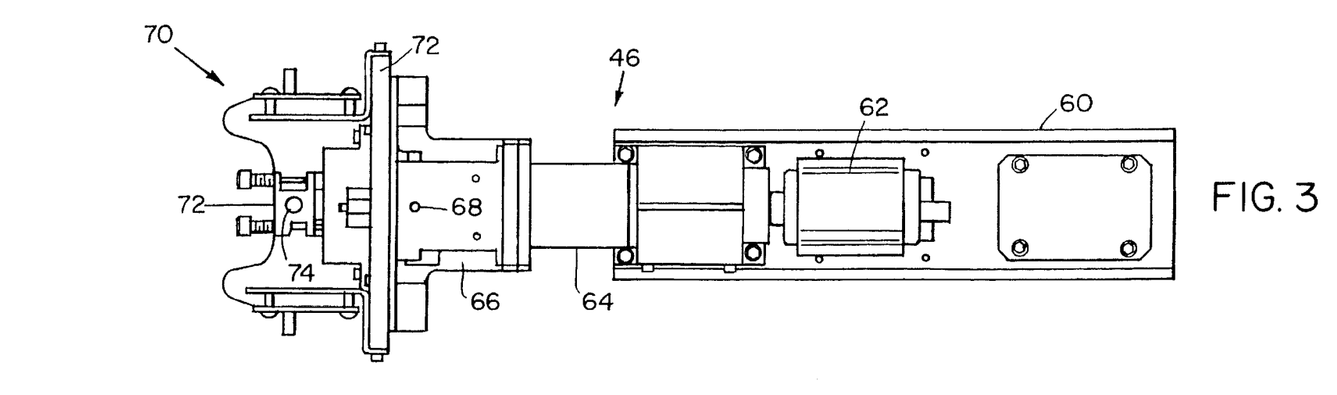
FIG. 3 is a bottom diagrammatic view of the optical head of FIG. 2.

The under side of optical head 46, is shown in more detail in FIG. 3. Camera holder assembly 60 encases CCD camera 62 which is optically connected to viewer gauge head 66 through pipe assembly 64. Viewer gauge head 66 includes a viewing aperture 68 for obtaining images from the lower surface to be aligned. Mounted on the end of optical head assembly 66 by means of adapter 72 is gap gauge head 70. Gap gauge head 70 includes optical sensor 72 which includes laser aperture 74 for directing a beam of coherent light, such as laser light, to one of the surfaces to be aligned. Within gap gauge head 70 there is included, a low power laser diode light source, collimating lense, objective lense and a detector (not shown) which will be discussed in more detail below. The top side of optical head 46 is similarly configured for obtaining images of the upper surface to be aligned.

Figure 4:
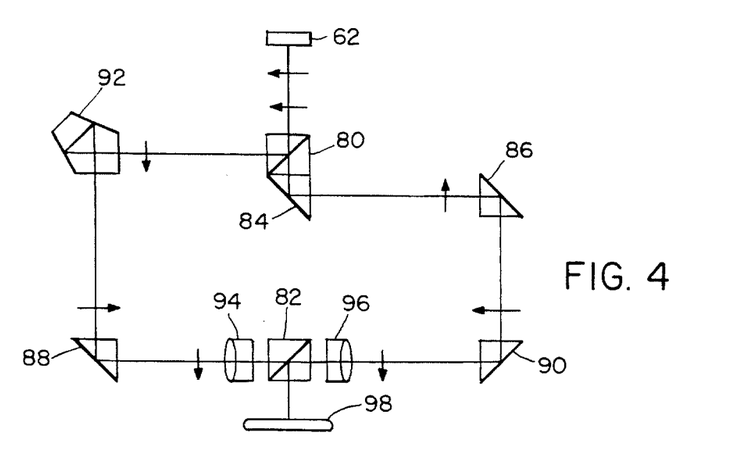
FIG. 4 is an optical schematic of the viewer gauge of FIG. 3.

The optical schematic diagram of viewer gauge 66 is shown in FIG. 4 which depicts CCD camera 62, beam splitters 80, 82, and right angle prisms 84, 86, 88 and 90. There is also included a penta prism 92 and imaging lenses 94 and 96. This optical system allows for the recovery of a CCD image of surface 98 which represents one of the surfaces to be aligned. An identical optical arrangement is used to image the other surface. The surfaces are superimposed and viewed on a monitor (not shown). The complementary features on the surfaces are then aligned by moving the lower holding fixture 26, FIG. 2, by means of joystick control or some other suitable means. At least three locations on the surfaces are then identified and stored by recording the position of the viewer gauge for later use in conjunction with the gap gauge head. The field of view of the CCD camera and optical system is approximately 400×700 microns. The viewer head is moved laterally in X and Y axes to bring a feature of interest into the field of view of the camera. The viewer gauge position at the desired point to be identified is determined by an encoder and it is then recorded.

Figure 5:
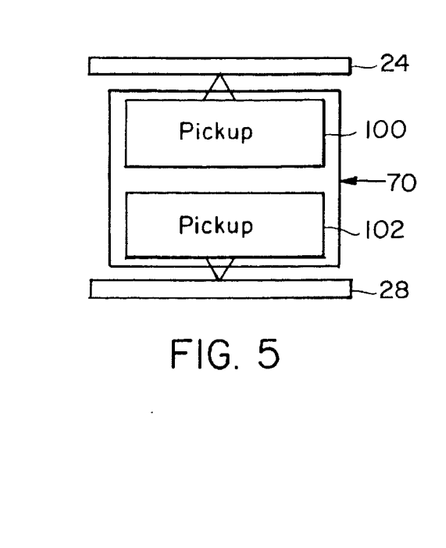
FIG. 5 is a block diagram of the gap gauge head of FIG. 3.
Figure 6:
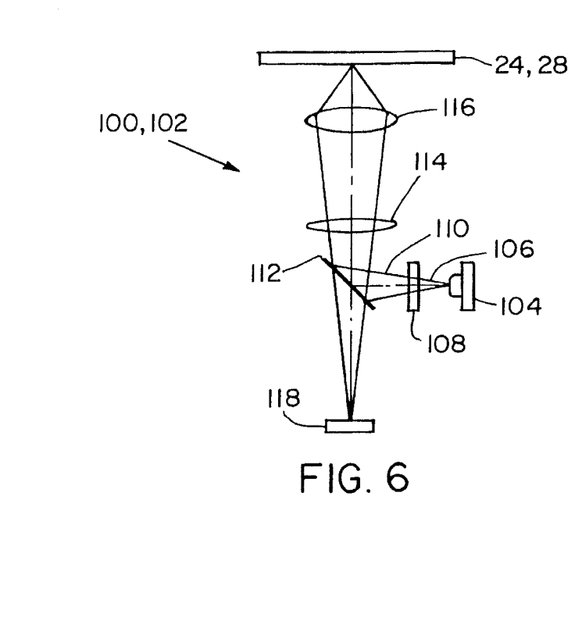
FIG. 6 is a schematic view of the gap gauge pick-up head of FIG. 5.

The gap gauge head 70 is shown in FIG. 5 to include pick-ups 100 and 102 for focusing beams of coherent light on the upper surface 24 and lower surface 28, respectively, for determining the distance between the two surfaces at the locations that are identified and stored by the viewer gauge 66. The design of the pick-ups 100 and 102 is shown in FIG. 6 where there is shown a low power semi-conductor laser 104 which transmits a laser beam 106 through diffraction grating 108 thereby causing the diffracted beam 110 to impinge on beam splitter 112 which directs the diffracted beam 110 in the direction of collimating lense 114 and objective lens 116. The objective lens 116 causes the beam to be directed to one surface (24, 28) to be aligned. The light reflected from the surface 24, 28 is then collected by the same objective lense 116 and passes back through collimating lens 114 and beam splitter 112 and is imaged on quadrant detector 118.

Figure 7A:
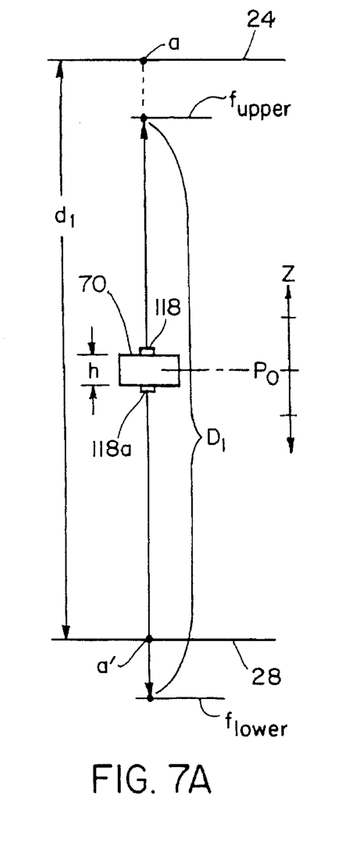
FIG. 7A–C demonstrate the operation of the gap gauge pick-up head for determining the distances between points on the surfaces.

By causing a beam of coherent light to be reflected from a surface to be aligned and to be focused on a quadrant detector, the distance between the surfaces can be determined. Fixed distance $D_1$, FIG. 7A, is the distance between points $f_{upper}$ and $f_{lower}$. Point $f_{upper}$ is a point in space where the laser beam focused on and reflected from a surface located at that point in space is focused on the quadrant detector. The same is true for $f_{lower}$. The distance $D_1$ also includes the height h of gap gauge head 70. The distance between the surfaces 24 and 28 at points a and a' on the surfaces is $d_1$.

Figure 7B:
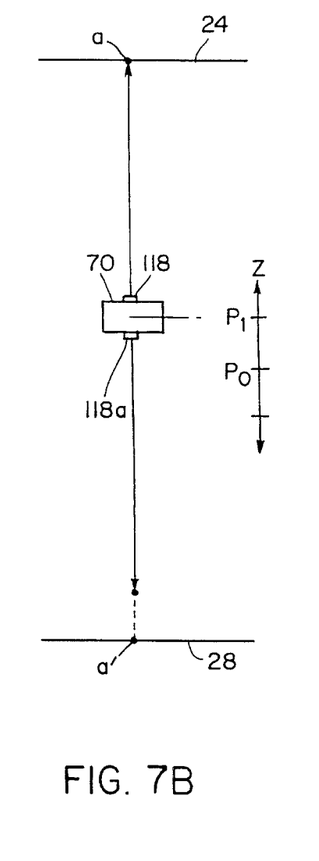
Figure 7C:
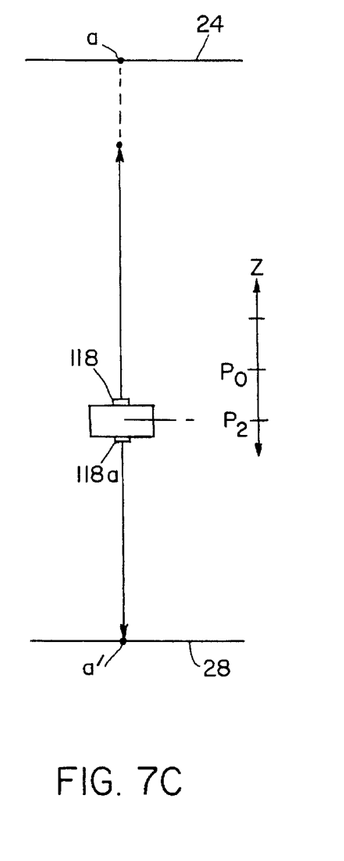

In determining the gap distance $d_1$ between upper surface 24 and lower surface 28, measurement begins at an arbitrary position $P_0$ which is recorded as the zero position of the gap gauge head 70 and it is determined if the coherent light source directed to the upper surface and reflected therefrom is focused on the quadrant detector 118 and on the upper surface 24. If the light source is not focused on the quadrant detector 118 after being reflected off upper surface 24, the gap gauge head is caused to be translated in the Z direction upward toward upper surface 24 in 0.4μ steps. Other step sizes may be used as well. At each step it is again determined whether or not the coherent light reflected off upper surface 24 is focused on the quadrant detector 118 and on the upper surface 24. In FIG. 7B, gap gauge head 70 is at a position $P_1$ where the light reflected from upper surface 24 is in focus on the quadrant detector 118 and on surface 24. This position $P_1$ is then recorded. It is then determined if coherent light being reflected off of lower surface 28 is in focus on the lower quadrant detector 118a. As shown in FIG. 7B it is not and the gap gauge head therefore needs to be located closer to the lower surface for the focus to occur. Thus gap gauge head 70 is translated towards the lower surface 28 to a point $P_2$ as shown in FIG. 7C. At point $P_2$ the light reflected from lower surface 28 is focused on the lower quadrant detector 118a and surface 28 and this position $P_2$ is recorded.

The gap distance $d_1$ between upper surface 24 and lower surface 28 may be calculated by the following equation:

$$d_1 = D_1 + (P_1 - P_2) \tag{1}$$

The gap distance must be measured at at least three locations on the surfaces 24 and 28 in order for the system according to this invention to properly align the surfaces, however, many distance measurements may be taken. The more locations on the surfaces that measurements are taken the better the accuracy of alignment.

Figure 8:
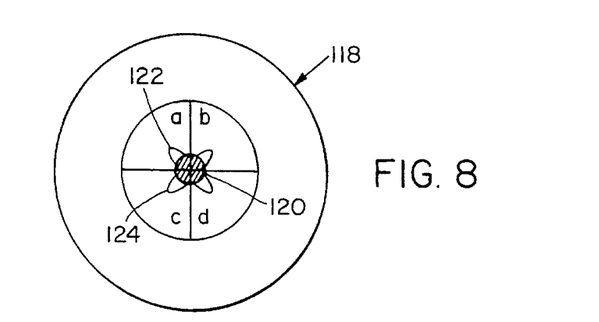
FIG. 8 is a top plan view of a quadrant detector according to this invention.

Quadrant detector 118, FIG. 8, is an optical transducer which includes quadrant sections a,b,c, and d. Focused beam image 120 includes an equal amount of light in each quadrant (a,b,c,d) of the detector. Images 122 and 124 are examples of images that are out of focus and therefore produce an image that does not have an equal amount of light in each quadrant.

Figure 9:
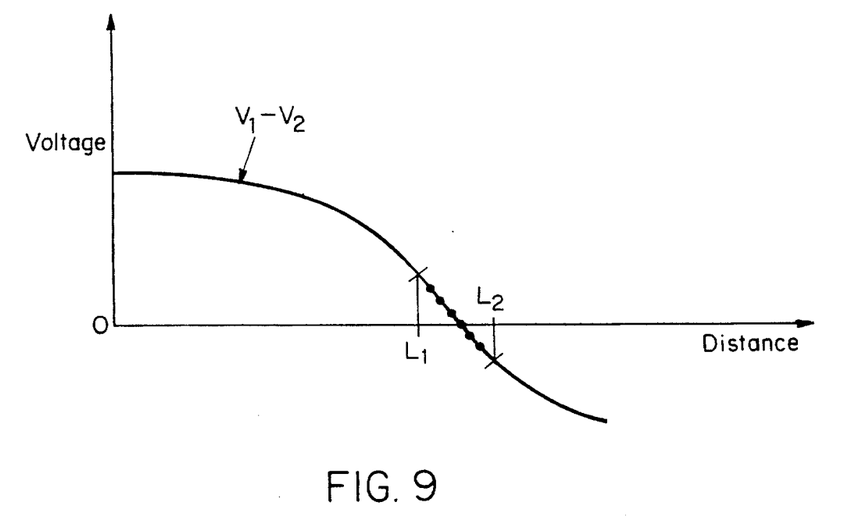
FIG. 9 is a plot of voltage ($V_1$–$V_2$) versus distance derived from the quadrant detector of FIG. 8.

The optical image signals on quadrant detector 118 in the four quadrants are converted to voltage signals. The voltage signals on quadrants b and d are combined to form a voltage signal $V_1$ and the voltages on quadrants a and c are combined to form voltage signal $V_2$. The differential signal $V_1-V_2$ is shown in FIG. 9. Where the differential signal equals zero, the amount of coherent light impinging on each quadrant of the quadrant detector 118 is equal, indicating the beam is in focus. Since it is difficult to determine precisely when the difference signal $(V_1-V_2)$ is equal to zero a number of voltages near the zero crossing between locations $L_1$ and $L_2$ are determined and a least squares fit is performed in order to determine the zero crossing with higher precision.

Figure 10:
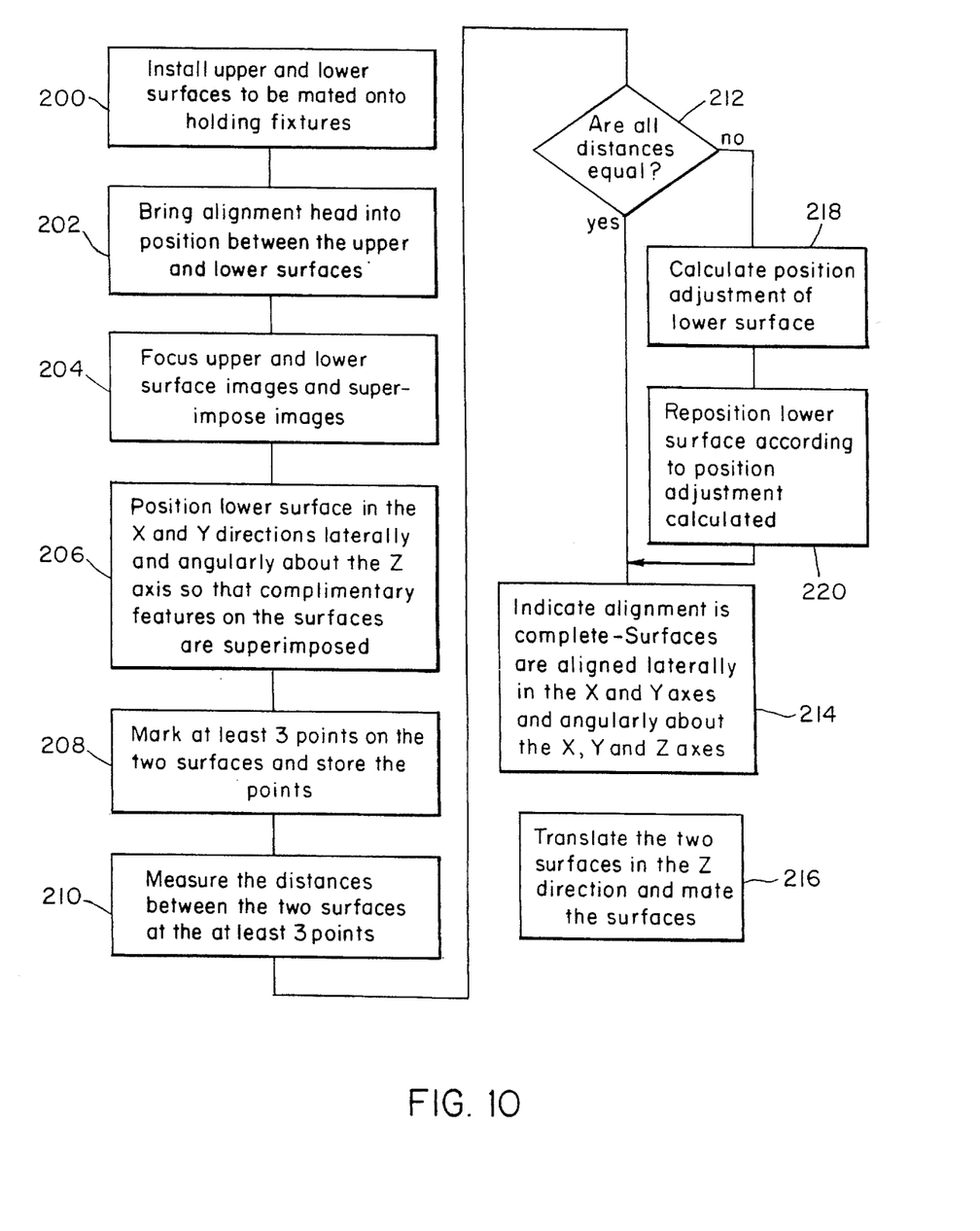
FIG. 10 is a flow chart of the software necessary to implement the alignment system according to this invention.

The software necessary to implement the alignment system of this invention operates according to the flow chart of FIG. 10. The source code is included in Appendix A. At step 200 the upper and lower surfaces to be mated are installed onto their respective holding fixtures and brought to within approximately 4.5 cm of each other, however, alternate designs can change this distance. The alignment head is then brought into position between the upper and lower surfaces, step 202, and the upper and lower surfaces are imaged, focused and superimposed at step 204. The lower surface image is then positioned laterally in the X and Y axes and angularly about the Z axis by joystick control or some other suitable means so that appropriate complementary features on the two surfaces are superimposed, step 206. At least three points on the two surfaces are then identified and stored at step 208. The points are marked by the operator who positions the viewer head above at least three locations on the surfaces and records the position of the viewer head thereby marking the locations. The system, under computer control, returns to the locations identified and stored at step 210 and measures the distances between the surfaces at each location. At step 212 it is determined whether the distances are equal and if they are the system indicates at step 214 that the alignment is complete, as the surfaces are aligned laterally in the X and Y direction axes and angularly about the X, Y and Z axes. At step 216 the surfaces are translated in the Z direction towards one another until they are mated. The surfaces may be brought together with a pre-determined mating force and that force may be maintained for a predetermined amount of time. If at step 212 all measured distances are not equal, at step 218, the amount and direction of position adjustment of the lower surface necessary to make the distances equal is calculated according to the following algorithm: The three distances are fit to the equation describing a plane surface in 3 dimensions $Z=AX+BY+C$. The correction angle for the X axis=arctan (A) (rotation about Y axis). The correction angle for the Y axis=arctan (B) (rotation about X axis).

At step 220 the lower surface is repositioned according to the adjustment motion calculated and at step 214 the system indicates that the alignment is complete. The surfaces are translated and mated at step 216.

This system may be operated manually or it may be easily fully automated by using pattern recognition, like the pattern recognition used in photolithography equipment for accomplishing the X and Y axis lateral alignment and Z axis angular alignment. Moreover, since the system is operated under computer control the operation of the system can be easily recorded to provide accurate traceability.

Figure 11:
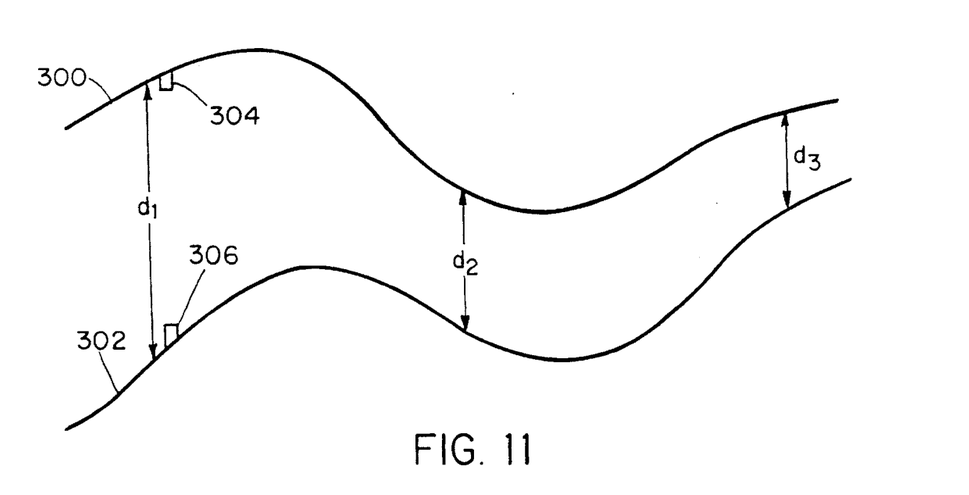
FIG. 11 is a side elevational view of two non-planar, conformal surfaces to be aligned.

The alignment and mating discussed so far has been directed to flat planar surfaces with complementary areas to be mated. However, this is not a necessary limitation of this invention, as the invention will work in the same manner for nonplanar, conformal surfaces like the surfaces shown in FIG. 11. The surfaces shown in FIG. 11, 300 and 302, contain reference fiducials 304 and 306, respectively. Similar to the flat planar surfaces with complementary features to be mated, these conformal surfaces may also contain complementary features or reference fiducials 304 and 306 that need to be mated. The alignment process for these surfaces is identical to that of the flat surfaces, wherein the conformal surfaces are first aligned laterally in the X and Y axes and angularly about the Z axis by superimposing images of the surfaces. Then the surfaces are angularly aligned about the X and Y axes by taking distance measurements between the two surfaces at at least three locations, for example at $d_1$, $d_2$, $d_3$, and adjusting the position of the lower surface with respect to the upper surface according to a calculated algorithm as described above.

Distance measurements between the two surfaces to be aligned must be taken at at least three locations, however, as the number of locations at which these distance measurements are taken increases so does the accuracy of alignment.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A system for aligning a first surface with respect to a second surface, comprising:

means for determining the distances between the first and second surfaces at at least three locations on the surfaces;

means, responsive to said means for determining, for detecting differences in the distances between the first and second surfaces at said at least three locations; and alignment means, responsive to said detecting means, for moving at least one of the surfaces until there is no nominal difference in the distances between the first and second surfaces at said at least three locations.

2. The system of claim 1 in which said means for determining includes optical means.

3. The system of claim 2 in which said optical means includes first and second coherent light sources.

4. The system of claim 3 in which said first and second coherent light sources are lasers.

5. The system of claim 4 in which said lasers are low power semi-conductor lasers.

6. The system of claim 3 further including means for directing said first light source to one of the first and second surfaces and said second light source to the other of the first and second surfaces.

7. The system of claim 6 further including means for ascertaining when the first and second light sources are focused on the first and second surfaces at said at least three locations.

8. The system of claim 7 further including means for calculating the distances between the surfaces at said at least three locations when said light sources are focused on the surfaces.

9. The system of claim 1 in which said alignment means aligns the surfaces angularly about the X and Y axes.

10. The system of claim 1 in which said alignment means includes means for aligning the two surfaces laterally in the X and Y axes and angularly about the Z axis.

11. The system of claim 10 in which said means for aligning the two surfaces laterally in the X and Y axes and angularly about the Z axis includes means for imaging the first and second surfaces.

12. The system of claim 11 in which said means for imaging includes means for superimposing first and second images and means for orienting the surfaces with respect to each other to achieve coincidence of complementary features on the surfaces.

13. The system of claim 12 which said means for imaging includes a CCD camera.

14. The system of claim 10 in which said means for aligning the two surfaces laterally in the X and Y axes and angularly about the Z axis includes means for identifying and storing position information of said at least three locations on the surfaces before the distances between the surfaces at said locations are determined.

15. The system of claim 1 in which said means for aligning includes means for calculating a position adjustment for at least one of the surfaces to effect alignment of the surfaces.

16. The system of claim 1 further including means for mating the first and second surfaces after alignment has been achieved.

17. The system of claim 16 in which said means for mating includes means for applying a pre-determined mating force for a pre-determined period of time to the surfaces to be mated.

18. A system for aligning a first surface with respect to a second surface angularly about the X and Y axes, comprising:

a first coherent light source directed at the first surface;

a second coherent light source directed at the second surface;

means for directing said first and second coherent light sources at at least three locations on the first and second surfaces;

means, responsive to said means for directing, for detecting any differences between the distances between the first and second surfaces at said at least three locations.

19. The system of claim 18 further including means for moving at least one of the surfaces until there is no nominal difference between the distances between the first and second surfaces at said at least three locations for aligning the surfaces.

20. A system for aligning a first surface with respect to a second surface laterally in the X and Y axes and angularly about the X, Y and Z axes, comprising:

means for imaging the first and second surfaces;

means for superimposing the images of the first and second surfaces;

means for detecting any differences in the distances between the first and second surfaces at at least three locations; and alignment means, responsive to said means for superimposing and said means for detecting, for aligning the first and second surfaces laterally in the X and Y axes and angularly about the X, Y and Z axes.

21. A system for aligning a first surface with respect to a second surface laterally in the X and Y axes and angularly about the X, Y and Z axes, comprising:

means for imaging the first and second surfaces;

means for superimposing the first and second surface images;

means for identifying and storing at least three positions on the first and second surfaces;

means, responsive said means for identifying and storing, for determining the distances between the first and second surfaces at said at least three locations on the surfaces;

means, responsive to said means for determining, for detecting differences in the distances between the first and second surface at said at least three locations; and alignment means, responsive to said means for determining and said means for detecting, for aligning the surfaces laterally in the X and Y axes, angularly about the Z axis, and angularly about the X and Y axes if one of the measured distances between the surfaces differs from any of the other distances at said at least three locations.

22. A method for aligning a first surface with respect to a second surface, comprising:

determining the distances between the first and second surfaces at at least three locations on the surfaces;

detecting differences in the distances between the first and second surfaces at said at least three locations; and aligning at least one of the surfaces until there is no nominal difference in the distances between the first and second surfaces at said at least three locations.

23. The method of claim 22 further includes directing a first light source to one of the first and second surfaces and a second light source to the other of the first and second surfaces.

24. The method of claim 23 further includes ascertaining when the first and second light sources are focused on the first and second surfaces at said at least three locations.

25. The method of claim 24 further includes calculating the distances between the surfaces at said at least three locations when said light sources are focused on the surfaces.

26. The method of claim 22 in which the step of aligning aligns the surfaces angularly about the X and Y axes.

27. The method of claim 22 in which the step of aligning includes aligning the two surfaces laterally in the X and Y axes and angularly about the Z axis.

28. The method of claim 27 in which aligning the surfaces laterally in the X and Y axes and angularly about the Z axis includes imaging the first and second surfaces.

29. The method of claim 28 in which the step of imaging includes superimposing first and second images and orienting the surfaces with respect to each other to achieve coincidence of complementary features on the surfaces.

30. The method of claim 29 in which the step of imaging includes imaging the surfaces with a CCD camera.

31. The method of claim 27 in which aligning the two surfaces laterally in the X and Y axes and angularly about the Z axis includes identifying and storing position information of said at least three locations on the surfaces before determining the distances between the surfaces.

32. The method of claim 22 in which the step of aligning includes calculating a position adjustment for at least one of the surfaces to effect alignment of the surfaces.

33. The method of claim 22 further including mating the first and second surfaces after alignment has been achieved.

34. The method of claim 22 in which the step of mating includes applying a pre-determined mating force for a pre-determined period of time to the surfaces to be mated.

35. A method for aligning a first surface with respect to a second surface angularly about the X and Y axes, comprising:

directing a first and a second coherent light source at at least three locations on the first and second surfaces;

detecting any differences between the distances between the first and second surfaces at said at least three locations.

36. The method of claim 35 further including moving at least one of said surfaces until there is no nominal difference between the distances between the first and second surfaces at said at least three locations for aligning the surfaces.

37. A method for aligning a first surface with respect to a second surface laterally in the X and Y axes and angularly about the X, Y and Z axes, comprising:

imaging the first and second surfaces;

superimposing the images of the first and second surfaces;

aligning the first and second surfaces laterally in the X and Y axes and angularly about the Z axis;

detecting any differences in the distances between the first and second surfaces at at least three locations; and aligning the surfaces angularly about the X and Y axes.

38. A method for aligning a first surface with respect to a second surface laterally in the X and Y axes and angularly about the X, Y and Z axes, comprising:

imaging the first and second surfaces;

superimposing the first and second surface images;

identifying and storing at least three locations on the first and second surfaces;

aligning the first and second surfaces laterally in the X and Y axes and angularly about the Z axis;

determining the distances between the first and second surfaces at said at least three identified and stored locations on the surfaces;

detecting differences in the distances between the first and second surfaces at said at least three locations; and aligning the surfaces angularly about the X and Y axes if one of the distances between the surfaces differs from any of the other distances at said at least three locations.

39. A system for aligning a first surface with respect to a second surface, comprising:

means for determining the distances between the first and second surfaces at at least three locations on the surfaces;

means, responsive to said means for determining, for detecting differences in the distances between the first and second surfaces at said at least three locations; and alignment means, responsive to said detecting means, for moving at least one of the surfaces until there is no nominal difference in the distances between the first and second surfaces at said at least three locations, said alignment means includes means for aligning the two surfaces laterally in the X and Y axes and angularly about the Z axis, said means for aligning the two surfaces laterally in the X and Y axes and angularly about the Z axis including means for imaging the first and second surfaces.

40. The system of claim 39 in which said means for imaging includes means for superimposing first and second images and means for orienting the surfaces with respect to each other to achieve coincidence of complementary features on the surfaces.

41. The system of claim 40 which said means for imaging includes a CCD camera.

42. The system of claim 39 in which said means for aligning the two surfaces laterally in the X and Y axes and angularly about the Z axis includes means for identifying and storing position information of said at least three locations on the surfaces before the distances between the surfaces at said locations are determined.

43. A method for aligning a first surface with respect to a second surface, comprising:

determining the distances between the first and second surfaces at at least three locations on the surfaces;

detecting differences in the distances between the first and second surfaces at said at least three locations; and aligning at least one of the surfaces until there is no nominal difference in the distances between the first and second surfaces at said at least three locations; the step of aligning including aligning the two surfaces laterally in the X and Y axes and angularly about the Z axis.

44. The method of claim 43 in which aligning the surfaces laterally in the X and Y axes and angularly about the Z axis includes imaging the first and second surfaces.

45. The method of claim 44 in which the step of imaging includes superimposing first and second images and orienting the surfaces with respect to each other to achieve coincidence of complementary features on the surfaces.

46. The method of claim 45 in which the step of imaging includes imaging the surfaces with a CCD camera.

* * * * *